(12) United States Patent
Kaku et al.

(10) Patent No.: US 11,171,871 B2
(45) Date of Patent: Nov. 9, 2021

(54) RELAY APPARATUS

(71) Applicant: DENSO CORPORATION, Kariya (JP)

(72) Inventors: Yoshifumi Kaku, Kariya (JP); Taichi Itagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 73 days.

(21) Appl. No.: 16/665,172

(22) Filed: Oct. 28, 2019

(65) Prior Publication Data

US 2020/0177511 A1 Jun. 4, 2020

(30) Foreign Application Priority Data

Nov. 29, 2018 (JP) .............................. JP2018-223375

(51) Int. Cl.
| | | |
|---|---|---|
| H04L 12/28 | (2006.01) | |
| H04L 12/801 | (2013.01) | |
| H04L 29/06 | (2006.01) | |
| H04L 29/12 | (2006.01) | |

(52) U.S. Cl.
CPC ........ *H04L 47/16* (2013.01); *H04L 29/12216* (2013.01); *H04L 63/20* (2013.01)

(58) Field of Classification Search
CPC ... H04L 12/46; H04L 12/4641; H04L 12/823; H04L 29/12028; H04L 29/12216; H04L 29/12226; H04L 29/12839; H04L 29/12924; H04L 45/66; H04L 47/16; H04L 47/20; H04L 47/32; H04L 49/354; H04L 61/103; H04L 61/2015; H04L 61/6022; H04L 61/6063; H04L 63/0236; H04L 63/1425; H04L 63/20

See application file for complete search history.

(56) References Cited

U.S. PATENT DOCUMENTS

| | | | | |
|---|---|---|---|---|
| 5,848,058 A * | 12/1998 | Ooyoshi | ............. | H04L 12/2854 370/244 |
| 6,996,113 B2 * | 2/2006 | Kikkawa | ............. | H04L 41/0627 370/401 |
| 7,787,479 B2 * | 8/2010 | Matsuo | ............... | H04L 12/4135 370/401 |
| 9,725,088 B2 * | 8/2017 | Yamakoshi | ........... | B60W 10/20 |
| 9,955,342 B2 * | 4/2018 | Ochiai | ................... | G07C 5/008 |
| 10,447,384 B2 * | 10/2019 | Tsuboi | ............... | H04B 7/18584 |
| 10,862,703 B2 * | 12/2020 | Ogawa | .................... | H04L 12/40 |
| 2007/0002745 A1 | 1/2007 | Ossman et al. | | |
| 2009/0304008 A1 | 12/2009 | Kono et al. | | |
| 2010/0027540 A1 | 2/2010 | Sato | | |
| 2015/0358351 A1 * | 12/2015 | Otsuka | ..................... | H04L 12/66 726/23 |
| 2016/0014036 A1 | 1/2016 | Oikawa | | |
| 2016/0087916 A1 * | 3/2016 | Janardhanan | ....... | H04L 63/1408 370/390 |
| 2018/0183816 A1 * | 6/2018 | Kawasaki | ............... | H04L 12/66 |

* cited by examiner

*Primary Examiner* — Frank Duong
(74) *Attorney, Agent, or Firm* — Posz Law Group, PLC (57) ABSTRACT

A relay apparatus executes either (i) transmitting a received frame, which is received from a communication line, to a different communication line or (ii) discarding the received frame as a discarded frame, according to a preset filtering rule. The relay apparatus stores discard information indicating information on the discarded frame in a preset discard recording storage when discarding the received frame as the discarded frame.

10 Claims, 7 Drawing Sheets

| RULE NO | APP PORT | DESTINATION ADDRESS | SOURCE MAC ADDRESS | TYPE | CONDITION | ... |
|---|---|---|---|---|---|---|
| 1 | P1 | 1ST ECU | 1ST ECU | IPv4 | xxx | |
| 2 | P4 | 4TH ECU | 4TH ECU | IPv4 | xxx | |
| 3 | | | | | | |
| ⋮ | | | | | | |

| RULE NO | APP PORT | DESTINATION ADDRESS | SOURCE MAC ADDRESS | TYPE | CONDITION | ... |
|---------|----------|---------------------|--------------------|------|-----------|-----|
| 1 | P1 | 1ST ECU | 1ST ECU | IPv4 | xxx | |
| 2 | P4 | 4TH ECU | 4TH ECU | IPv4 | xxx | |
| 3 | | | | | | |
| ⋮ | | | | | | |

| FILTERING RULE | VALID/INVALID |
|----------------|---------------|
| 1 | VALID |
| 2 | VALID |
| 3 | INVALID |
| ... | ... |

| PORT | VALID/INVALID |
|------|---------------|
| 1 | VALID |
| 2 | VALID |
| 3 | INVALID |
| 4 | INVALID |
| ... | ... |

| # | RECEIVE PORT | FILTERING RULE | FRAME | TIME STAMP | CUMULATIVE NO |
|---|---|---|---|---|---|
| 1 | 1 | 1 | Eth HEADER/IP HEADER/TCP HEADER | 123456 | 1 |
| 2 | 2 | 1 | Eth HEADER/IP HEADER/UDP HEADER | 234567 | 2 |
| 3 | 1 | 2 | Eth HEADER/IP HEADER/— | 345678 | 1 |
| ... | ... | ... | ... | ... | ... |
| 100 | | | | | |

|  | UDP FRAME |
|---|---|
| Ether HEADER | D-MAC |
|  | S-MAC |
|  | EtherType |
| IP HEADER | Version |
|  | Header Length |
|  | ToS |
|  | Total Length |
|  | ID |
|  | Fragment Offset |
|  | TTL |
|  | Protocol |
|  | Header Check SUM |
|  | S-IP |
|  | D-IP |
| UDP HEADER | S-UDP Port |
|  | D-UDP Port |
| UDP PAYLOAD | SEQUENCE NO. |
|  | DUMP DATA LENGTH |
|  | DUMP DATA |

RELAY APPARATUS

CROSS REFERENCE TO RELATED APPLICATION

The present application claims the benefit of priority from Japanese Patent Application No. 2018-223375 filed on Nov. 29, 2018. The entire disclosure of the above application is incorporated herein by reference.

TECHNICAL FIELD

The present disclosure relates to a relay apparatus that relays a frame between a plurality of communication lines.

BACKGROUND

There is known a relay apparatus provided with a function of filtering frames that are to be relayed. A frame is general data including a header and actual data corresponding to a predetermined protocol.

SUMMARY

According to an example of the present disclosure, a relay apparatus executes either (i) transmitting a received frame, which is received from a communication line, to a different communication line or (ii) discarding the received frame as a discarded frame, according to a preset filtering rule. The relay apparatus stores discard information indicating information on the discarded frame in a preset discard recording storage when discarding the received frame as the discarded frame.

BRIEF DESCRIPTION OF DRAWINGS

The objects, features and advantages of the present disclosure will become more apparent from the following detailed description made with reference to the accompanying drawings. In the drawings.

DETAILED DESCRIPTION

1. Overview

An Ethernet (registered trademark) switch is known as a network switch configured to relay a frame between a plurality of communication apparatuses. The Ethernet switch has security functions such as the ability to filter frames, but does not provide a function to record discarded frames; this makes it difficult to analyze security attacks later.

Therefore, in this embodiment, the Ethernet switch having a security function includes (i) a relay processing module, (ii) a storage processing module, and (iii) a recording storage; the relay processing module is configured to discard the received frame according to a specified policy. The storage processing module is configured to store information (i.e., discard information) on a frame to be discarded such as a part of the data of the frame, the factor of the discard, the reception port, and the time stamp in the recording storage. Note that "information" may be used to be not only uncountable but also countable in the present disclosure. That is, an "information" may be equivalent to an information-item; a plurality of informations may be equivalent to a plurality of information-items. Further, an information may be used to be equivalent to a data or a data-item; a plurality of informations may be used to be equivalent to a plurality of data or a plurality of data-items.

The recording storage records the sum of discarded frames (total discarded frame count) for each discard factor. The discard information is configured to be read by a tool. This makes it possible to analyze security attacks. The frame to be recorded (i.e., a recording target frame) can be specified or determined for each discard factor or for each port, and can be used to analyze a specific attack.

Details of such a configuration will be described below.

2. Embodiment

Hereinafter, embodiments of the present disclosure will be described with reference to the drawings.

2-1. Configuration

A communication system 1 is mounted on a vehicle such as a passenger car and is a system for relaying frames between communication apparatuses in the vehicle.

Figure 1:
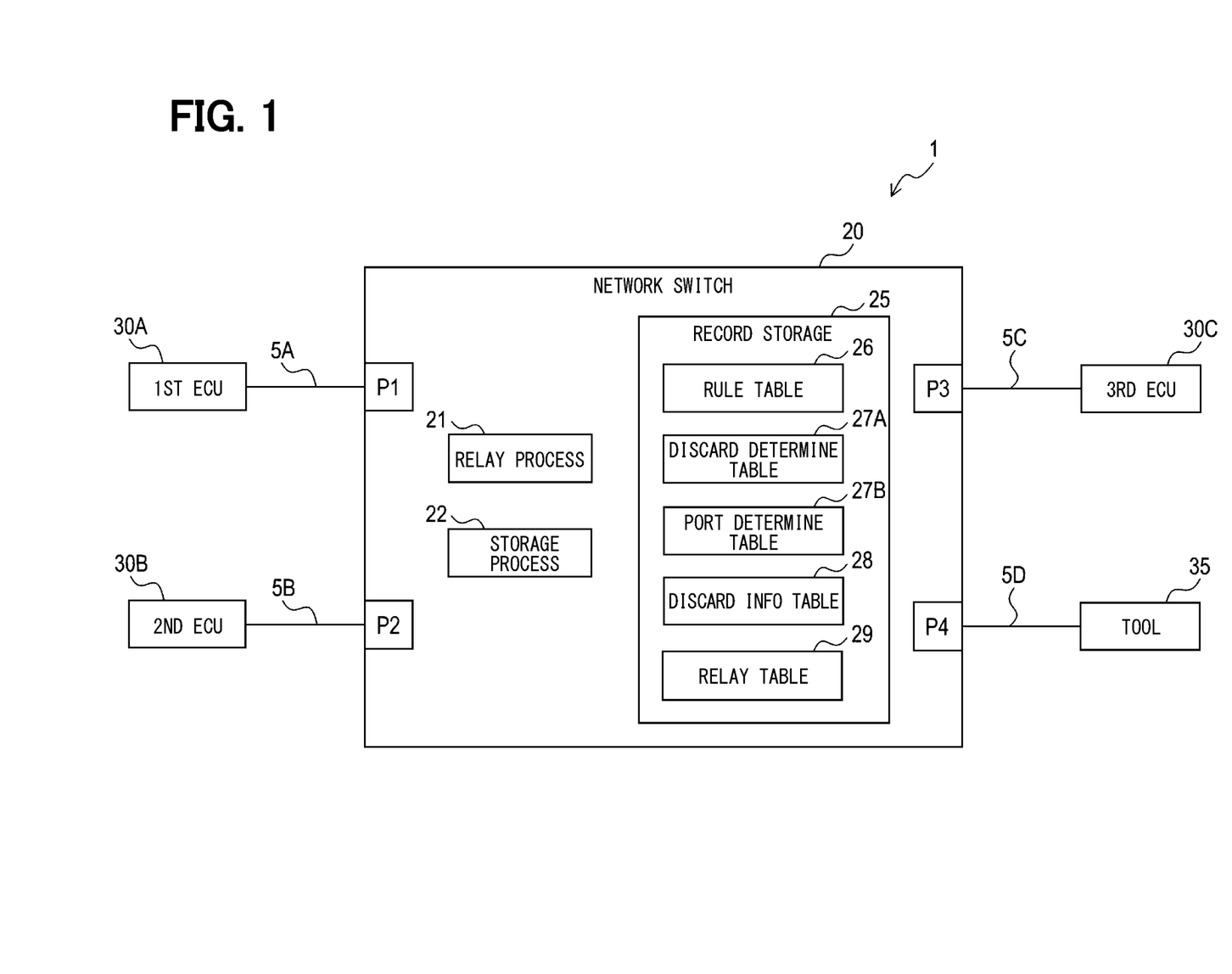
FIG. 1 is a block diagram showing a configuration of a communication system.

The communication system 1 illustrated in FIG. 1 includes a network switch 20 that is a relay apparatus. Further, the communication system 1 may further include a first ECU 30A, a second ECU 30B, a third ECU 30C, and a tool 35. The network switch 20 may include ports P1, P2, P3, and P4.

The first ECU 30A is connected to the communication line 5A; the second ECU 30B is connected to the communication line 5B. The third ECU 30C is connected to the communication line 5C. The tool 35 is connected to the communication line 5D. The first ECU 30A, the second ECU 30B, the third ECU 30C, and the tool 35 communicate with each other via the communication lines 5A, 5B, 5C, 5D and the network switch 20. The first ECU 30A, the second ECU 30B, the third ECU 30C, and the tool 35 are included in a communication apparatus.

The four communication lines 5A, 5B, 5C, and 5D are respectively connected to the ports P1, P2, P3, and P4. The ports P1, P2, P3, and P4 function as transceivers that transmit and receive frames.

The network switch 20 is configured as a layer 2 switch that communicates using protocols such as Ethernet and Internet Protocol, for example. The network switch 20 is configured to relay frames while filtering between the plurality of communication lines 5A, 5B, 5C, and 5D.

The network switch 20 is configured as hardware circuits or circuitry including a circuit such as a semiconductor device, for example. The network switch 20 includes a relay processing module 21, a storage processing module 22, and a recording storage 25.

The relay processing module 21 manages the overall relay of frames. For example, the relay processing module 21 performs S110, S120, and S150 of the relay process to be described later, and selects whether to relay or discard the received frame according to filtering rules prepared in advance. Filtering rules are used to determine whether to relay or discard a received frame according to the frame characteristics such as an address, frame format, frame data length, and frame type included in the received frame.

When the relay processing module 21 discards the frame, the storage processing module 22 stores the discard information in the recording storage 25 in S130 and S140 of the relay process described later. The discard information represents information regarding a frame to be discarded. In the present embodiment, the discard information includes header information about the frame to be discarded. The header information will be described later.

Further, the storage processing module 22 transmits the discard information recorded in the recording storage 25 to an external instrument or apparatus such as the tool 35 by performing a discard information transmission process described later. The recording storage 25 is configured to record a rule table 26, a discard determination table 27A, a port determination table 27B, a discard information table 28, and the a relay table 29.

Figure 2:
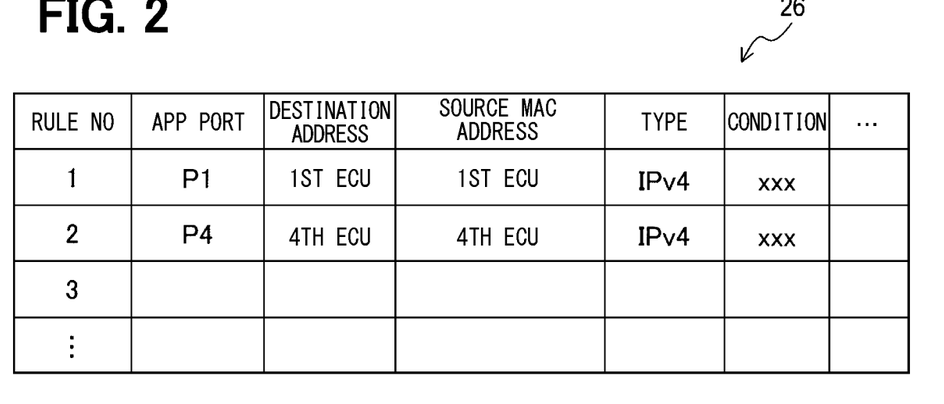
FIG. 2 is an explanatory diagram illustrating an example of a rule table.

The rule table 26 describes a plurality of filtering rules. In the rule table 26, the description items for one row are described as an individual filtering rule as shown in FIG. 2.

Each filtering rule includes a rule number (No.), an applicable port, a destination address, a source MAC address, a type, and other conditions.

The rule number is a number for specifying a filtering rule, and a unique number is assigned to each filtering rule. The application port indicates a port to which the filtering rule is applied among the ports P1, P2, P3, and P4. The destination address describes the address of the ECU that is a transmission destination of the frame, for example, the MAC address.

Note that the destination address may be an address other than the MAC address, such as an IP address. The type indicates the version of an Internet protocol such as IPv4 or IPv6. Here, in the example shown in FIG. 2, the filtering rule with rule number 1 describes (i) a rule which transfers only the frame whose source address is the first ECU 30A among the IPv4 frames received at the port P1; and (ii) a rule which transfers only the frame whose destination address is the first ECU 30A among the IPv4 frames transmitted from the port P1. The filtering rule with rule number 2 describes (i) a rule which transfers only the frame whose source address is the tool 35 (i.e., fourth ECU) among the IPv4 frames received at the port P4; and (ii) a rule which transfers only the frame whose destination address is the tool 35 (i.e., fourth ECU) among the IPv4 frames transmitted from the port P4.

Figure 3:
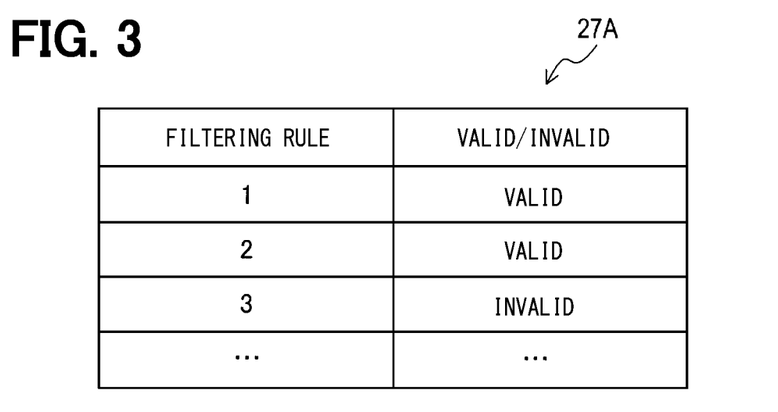
FIG. 3 is an explanatory diagram illustrating an example of a discard determination table.
Figure 4:
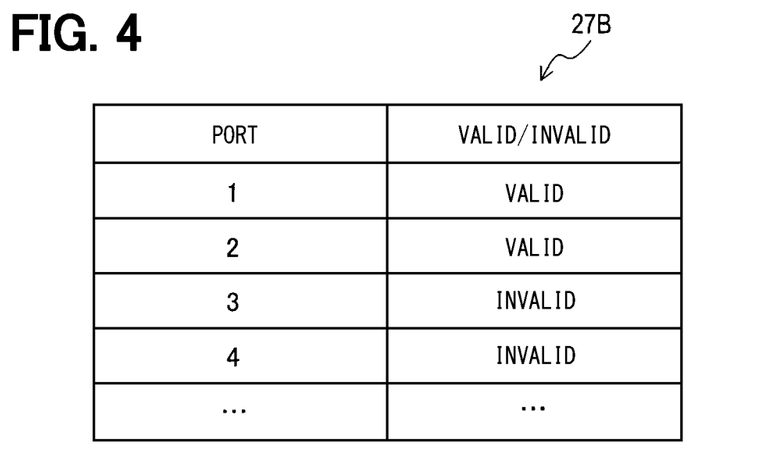
FIG. 4 is an explanatory diagram illustrating an example of a port determination table.

In addition, although many filtering rules can be set in the rule table 26, description is abbreviated here. The discard determination table 27A and the port determination table 27B are tables describing settings for determining whether or not the discard information is stored in the recording storage 25. In the discard determination table 27A, as shown in FIG. 3, a plurality of filtering rules are associated with valid or invalid settings for storing discard information. In the port determination table 27B, as shown in FIG. 4, a plurality of ports P1, P2, P3, and P4 are associated with valid or invalid settings for storing discard information.

For example, in the example shown in FIG. 3, the filtering rule number "1" is associated with "valid". This signifies that the storage processing module 22 needs to store the discard information in the recording storage 25 when the relay processing module 21 discards the frame according to the filtering rule "1". On the other hand, in the example shown in FIG. 3, the filtering rule number "3" is associated with "invalid". This signifies that the storage processing module 22 needs not to store the discard information in the recording storage 25 when the relay processing module 21 discards the frame according to the filtering rule "3".

In the present embodiment, the storage processing module 22 stores the discard information, which is determined to be valid in both the discard determination table 27A and the port determination table 27B, in the recording storage 25, while not storing the discard information, which is determined to be invalid in either the discard determination table 27A or the port determination table 27B.

Figure 5:
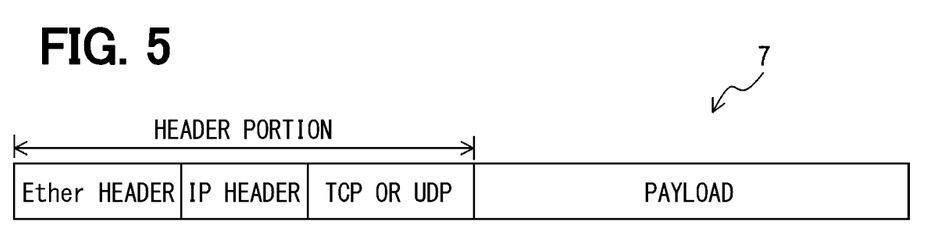
FIG. 5 is an explanatory diagram illustrating a structure example of a reception frame.

Here, the frame 7 transmitted or received by each communication line 5A, 5B, 5C, 5D has a structure as shown in FIG. 5, for instance. That is, the frame 7, which includes a header portion and a payload that is actual data, is transmitted and received in the order of the header portion and the payload. The header portion includes an Ether header, an IP header, and a UDP header. Note that a TCP header may be provided instead of the UDP header.

Figure 6:
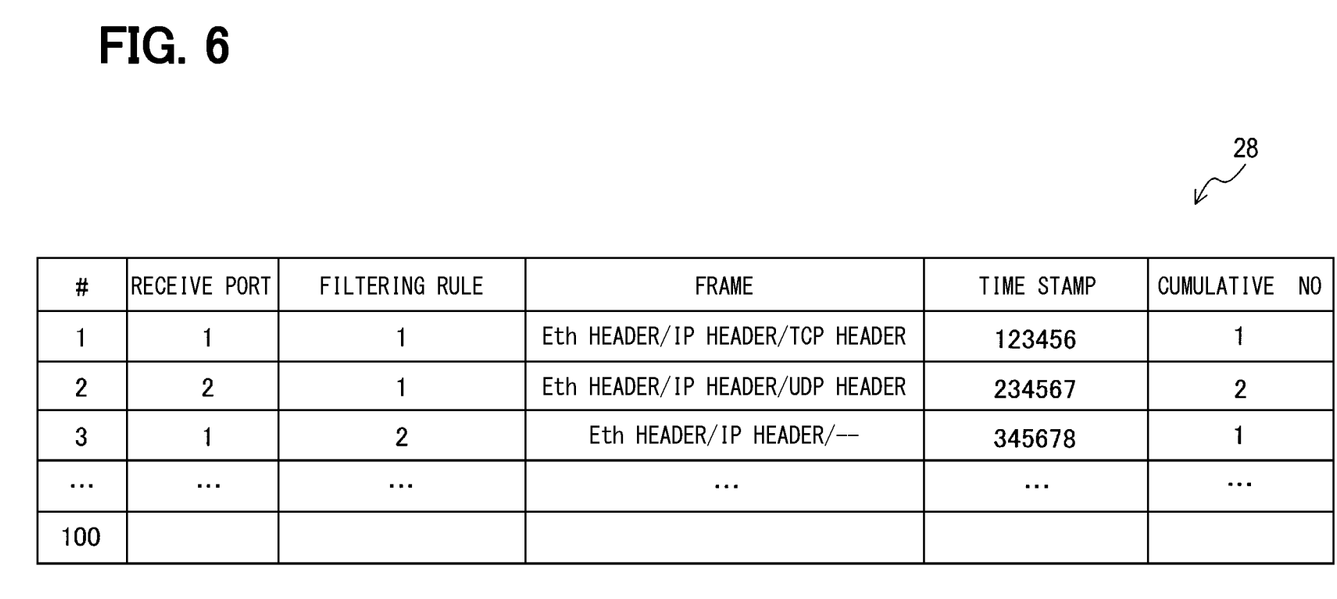
FIG. 6 is an explanatory diagram showing an example of a discard information table.

The discard information table 28 is a recording area for storing a plurality of discard information(s) with respect to the discarded frames in the order from the discard information of the earliest discarded frame to that of the latest discarded frame. In the present embodiment, as shown in FIG. 6, the discard information table 28 contains a plurality of columns for storing data included in the discard information. Here, the "#" column indicates the order of occurrence of discard, i.e., what number of the discarded frame in the order of occurrence; eventually, the number or numerical value described in the latest "#" column (i.e., the lowest "#" column) corresponds to the sum of the discarded frames so far. The discard information table 28 includes individual discard information identified by a unique number described in the "#" column. The discard information includes the reception port, filtering rule, frame content, time stamp, and cumulative number.

The discard information table 28 describes the port that received the discarded frame in the column of the reception port. The filtering rule column describes the filtering rule number indicating a factor that causes the frame to be discarded. The frame content column includes header information as discard information.

The header information indicates data of the header portion of the frame 7 shown in FIG. 5. The header information only needs to include at least an Ethernet header, a VLAN Tag, an IP header, a TCP header, or a UDP header (i.e., include at least one of headers that are an Ethernet header, a VLAN Tag, an IP header, a TCP header, and a UDP header). Note that the VLAN Tag indicates, for example, a VLAN ID used in a tag VLAN (TagVLAN) defined by IEEE802.1q.

The time stamp column describes numerically information regarding the time when the frame is discarded or the time when the discard information is generated. The cumulative number column describes the number of times the frames are discarded for each filtering rule. That is, the cumulative number column corresponds to the number of discards with respect to each filtering rule that serves as a discard factor.

Note that in the present embodiment, the discard factor corresponds to a filtering rule. There is however no need to be limited thereto; the discard factor may be differently defined. Further, if a certain one frame is discarded from a plurality of discard factors, a plurality of "#" columns are listed up at the same time or one time. In such a case, the sum of all the cumulative numbers identified by all the "#" columns is not equal to the numerical value in the latest "#" column.

The relay table 29 is a table that records the destination address of the ECU connected to each port. The relay table 29 is referred to by the relay processing module 21 when the relay processing module 21 specifies a destination port of a frame.

The tool 35 is an instrument or apparatus that reads the discard information stored in the recording storage 25 and analyzes a security attack or the like based on the read discard information. The tool 35 is configured to be detachable with respect to the communication line 5D, and is connected to the communication line 5D as necessary, such as during vehicle inspection. Further, when a predetermined operation by the user is input, the tool 35 transmits an external command for requesting discard information to the network switch 20 via the communication line 5D.

The present embodiment describes the case where the number of communication lines connected to the network switch 20 is four. The number of communication lines may however be any number as long as it is two or more.

2-2. Processing 2-2-1. Relay Process

Figure 7:
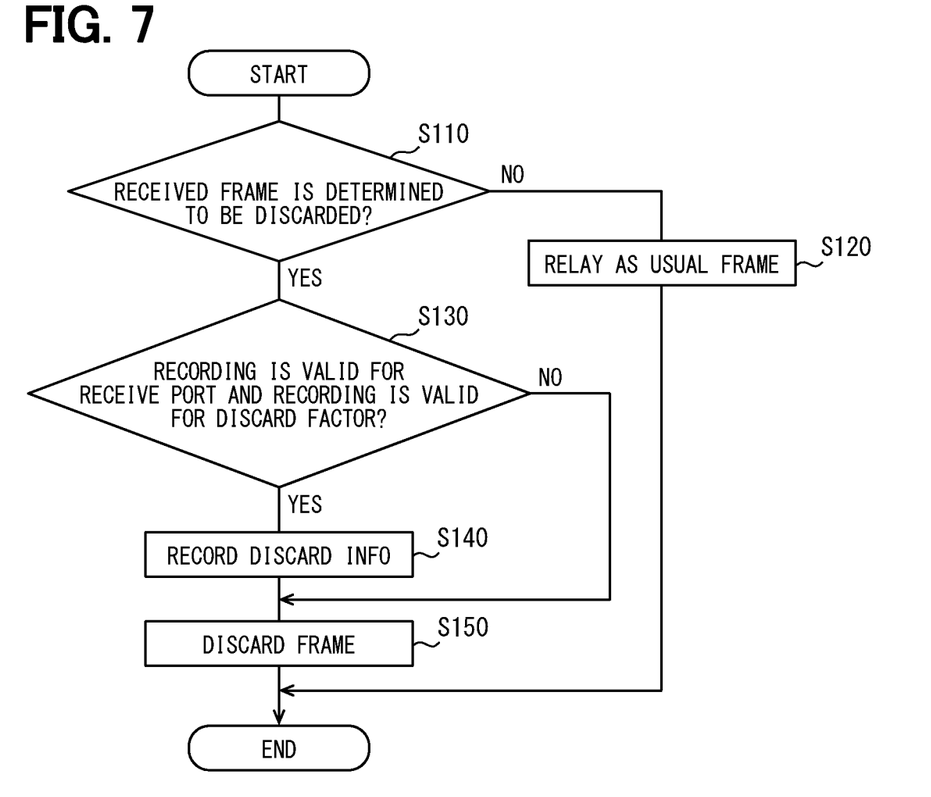
FIG. 7 is a flowchart of a relay process.

The relay process executed by the network switch 20 will be described with reference to the flowchart of FIG. 7. The relay process starts when a frame is received from any port, for example.

In the relay process, first, in S110, the network switch 20 determines whether or not the received frame is determined to be discarded. That is, the relay processing module 21 specifies the port where the destination address described in the header portion of the frame exists with reference to the relay table 29, and determines whether to relay the frame to the destination address or discard the frame according to the rule table 26 to thereby determine whether the frame is discarded or not.

When the network switch 20 determines in S110 that the received frame is not determined to be discarded, the network switch 20 proceeds to S120. In S120, a relay process for relaying the normal frame to the destination address is performed as a normal frame that is not a frame to be discarded. The relay process of FIG. 7 is then ended.

On the other hand, when the network switch 20 determines in S110 that the received frame is determined to be discarded, the network switch 20 proceeds to S130. In S130, it is determined whether or not the recording of the discard information is set to be valid for the reception port that is a port having received the received frame, and, simultaneously, the recording of the discard information is set to be valid for the discard factor.

In other words, in this process, when discarding a frame, it is determined whether or not the discarded frame is a storage target frame. The storage target frame is included in the frames determined to be discarded according to the filtering rules; further, the storage target frame is a frame or a discarded frame of which the corresponding discard information is set to be stored or recorded in the recording storage 25.

When the network switch 20 determines in S130 that the recording of the discard information is set to be valid for the reception port and the recording of the discard information is set to be valid for the discard factor, the network switch 20 proceeds to S140. In S140, the discard information is stored in the discard information table 28 of the recording storage 25. Thereafter, the process proceeds to S150.

On the other hand, when the network switch 20 determines in S130 that the recording of the discard information is not set to be valid for the reception port or the recording of the discard information is not set to be valid for the discard factor, the process proceeds to S150. In S150, the received frame is discarded; then, the relay process in FIG. 7 is ended.

2-2-2. Discard Information Transmission Process

Figure 8:
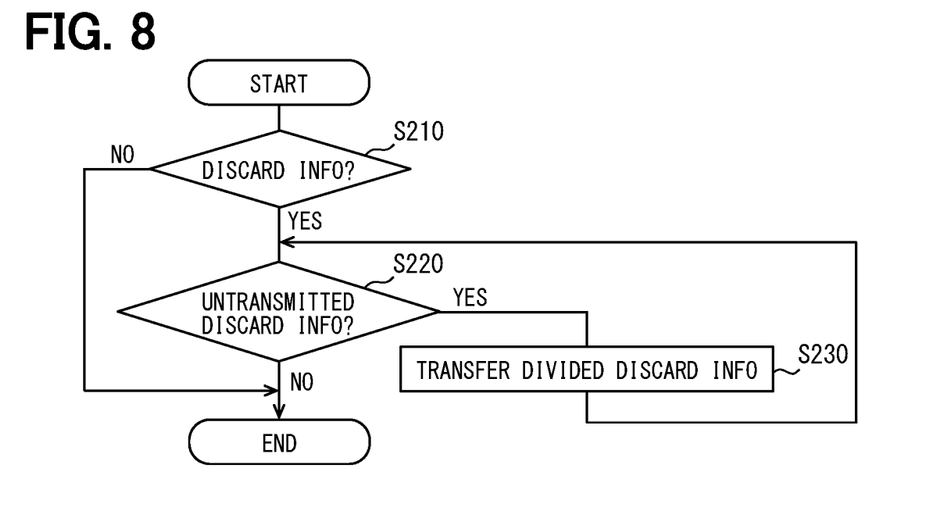
FIG. 8 is a flowchart of a discard information transmission process.

Next, the discard information transmission process executed by the network switch 20, particularly by the storage processing module 22, will be described with reference to the flowchart of FIG. 8. The discard information transmission process is a process that is started when the network switch 20 receives an external command requesting discard information from the tool 35.

In the discard information transmission process, first, in S210, the network switch 20 determines whether or not the discard information is stored in the recording storage 25. When it is determined in S210 that the discard information is not stored in the recording storage 25, the discard information transmission process in FIG. 8 is ended.

On the other hand, when the network switch 20 determines in S210 that the discard information is stored in the recording storage 25, the network switch 20 proceeds to S220, where it is determined whether there is untransmitted discard information. When it is determined in S220 that there is no untransmitted discard information, the discard information transmission process in FIG. 8 is ended.

On the other hand, when the network switch 20 determines in S220 that there is untransmitted discard information, the network switch 20 proceeds to S230, where untransmitted discard information is divided as needed and transferred to the tool 35. Then the process returns to S220. The storage processing module 22 manages the transmitted discard information such that the transmitted discard information is distinguished from the untransmitted discard information by setting a transmitted flag, for example.

Figure 9:
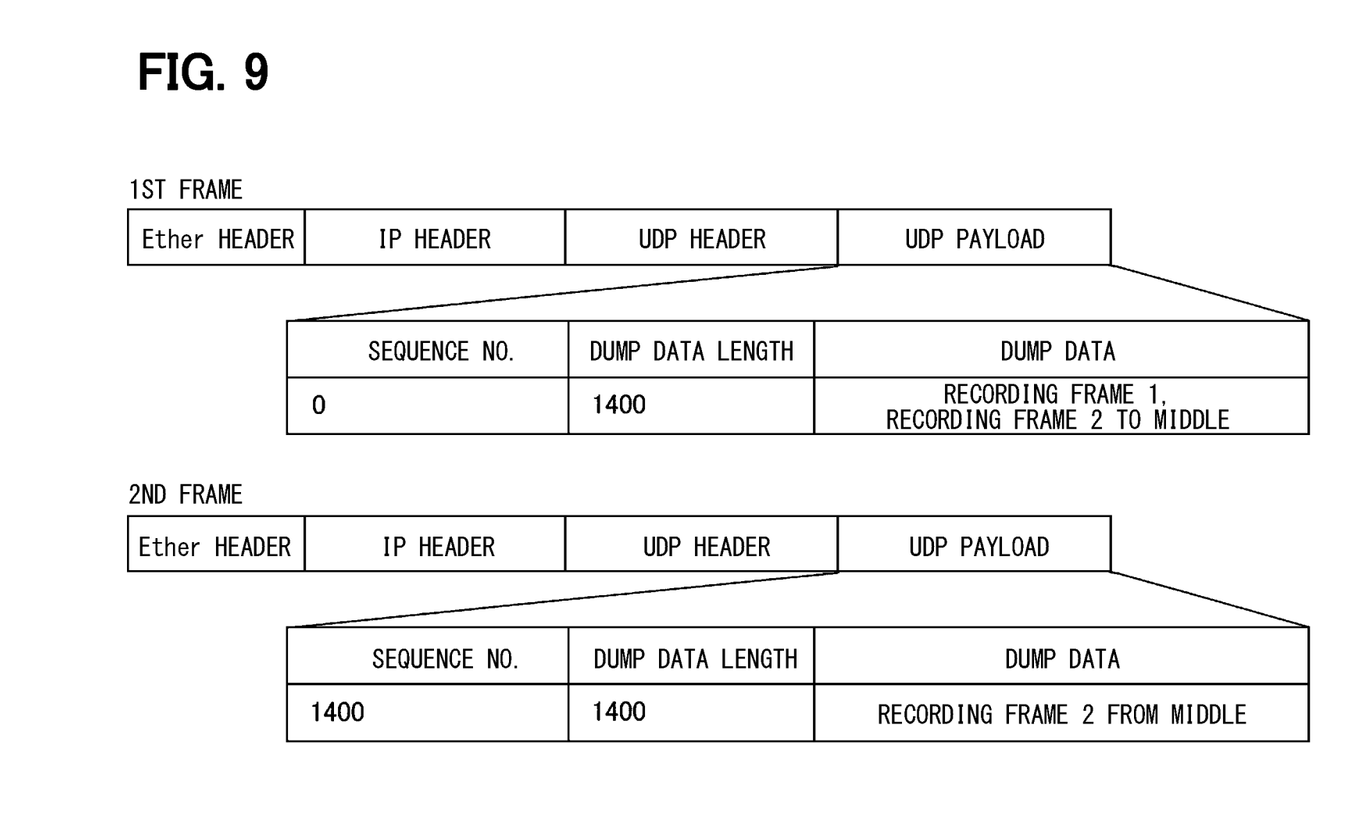
FIG. 9 is an explanatory diagram showing an example of a frame including discard information transmitted to a tool.

Details of processing for transmitting untransmitted discard information will be described below. In S230, the storage processing module 22 generates a frame whose data format is at least one of protocols that include Ethernet, IP, and UDP protocols, as shown in FIG. 9. In this case, the tool 35 is designated as the destination in the header portion of the frame, and the payload that is the actual data portion of the frame is set to include the discard information read from the recording storage 25. The generated frame is transmitted to the tool 35 by the storage processing module 22 in accordance with the description of the header portion.

The discard information is divided into payload portions of a plurality of frames as necessary. For example, suppose a case that (i) the storage processing module 22 transmits the discard information of the recording frame 1 and the discard information of the recording frame 2, and (ii) a single frame is able to transmit only the discard information of the recording frame 1. In such a case, as shown in FIG. 9, the storage processing module 22 puts (i) an entirety of the recording frame 1 and (ii) data up to the middle of the recording frame 2 into the payload portion of the first frame. Dividing the data by the storage processing module 22 is managed by a sequence number included in the header portion. The sequence number of the first frame is set to 0 indicating the first data.

Then, the storage processing module 22 puts the remaining data of the recording frame 2 in the payload portion of the second frame. The sequence number of the second frame is set to 1400 when the payload portion of the first frame is 1400 bytes.

Figure 10:
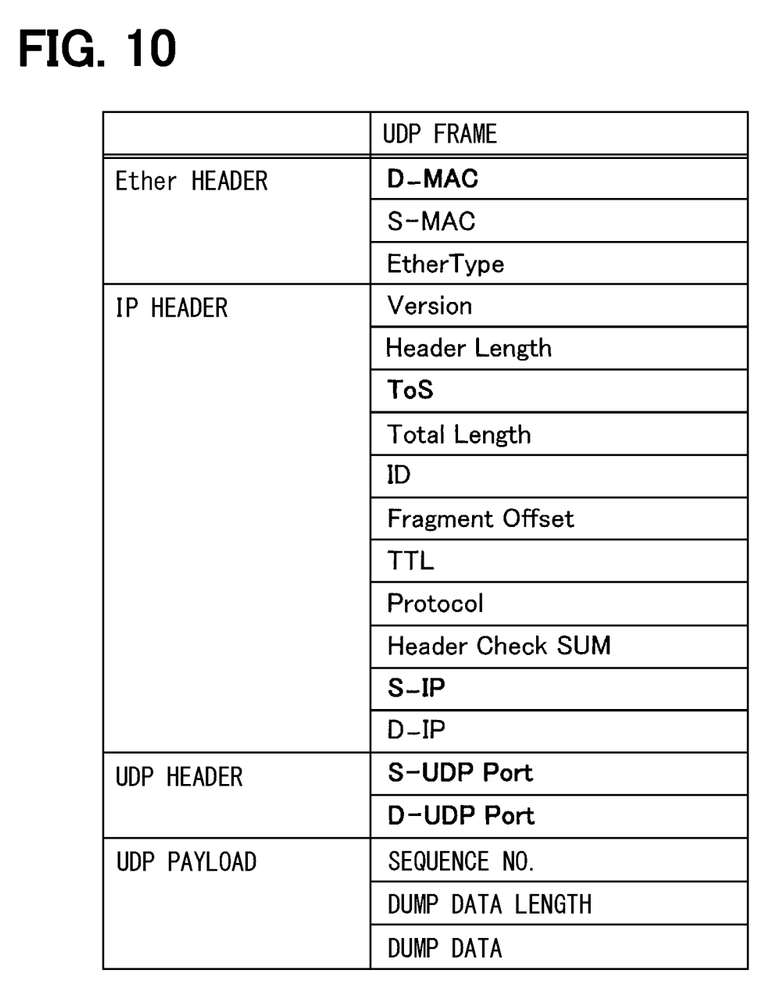
FIG. 10 is an explanatory diagram illustrating an example of data included in a header portion.

Note that information as shown in FIG. 10 can be stored in the header portion of the frame generated by the storage processing module 22 in S230. The information included in the header portion may be a preset value or a value calculated according to the content of the frame to be transmitted.

2-3. Effects

According to the embodiment described in detail above, the following effects are obtained.

(2a) The communication system 1 includes a network switch 20 configured to relay a frame between a plurality of communication lines; the network switch 20 includes a relay processing module 21 and a storage processing module 22. In S110, S120, and S150, the relay processing module 21 is configured to selectively execute either (i) transmitting a frame received from one of the communication lines to another communication line or (ii) discarding the frame, according to a preset filtering rule. In S130 and S140, the storage processing module 22 is configured to store, in the recording storage 25 set in advance, the discard information indicating the information related to the discarded frame in response to that the frame is discarded.

According to such a configuration, when the frame is discarded according to the filtering rule, the discard information can be recorded. Therefore, when a security attack such as unauthorized access is received, the discard information is referred to later and the security attack can be analyzed. The discard information may include at least a part of the frame to be discarded. In this case, the discard information may include a predetermined part of the frame or the entire frame.

(2b) In S130 and S140, the storage processing module 22 stores the discard information. The stored discard information includes at least one of data elements that are (i) the reception port indicating the port that received the frame, (ii) the discard factor, (iii) the time stamp, which indicates the time when the frame was discarded or the time when the discard information was generated.

According to such a configuration, since the discard information includes at least the reception port, or the discard factor, or the time stamp, it is possible to easily analyze the contents of the security attack from the discard information.

(2c) In S140, in addition to the reception port, the discard factor, and the time stamp, the storage processing module 22 is configured to record (i) the sum of the discarded frames for each discard factor and (iii) the sum of the discard factors for which the received frames are discarded, in the recording storage 25.

According to such a configuration, since the sum of the discarded frames for each discard factor and the sum of the discard factors for which the received frames are discarded can be used, the contents of the security attack can be easily analyzed.

(2d) In S130 and S140, the storage processing module 22 stores header information including at least one of headers that include the Ethernet header, VLANTag, IP header, TCP header, and UDP header, as discard information.

According to such a configuration, since header information related to an address or the like is stored, the frame characteristics can be efficiently stored while saving the capacity of the recording storage storing the discard information as compared with the configuration storing the whole of the frames.

(2e) Upon receiving a preset external command in S230, the storage processing module 22 is configured to transmit the discard information stored in the recording storage 25 to the tool 35 that is a preset external instrument or apparatus.

According to such a configuration, the discard information can be transmitted to the tool 35 in accordance with an external command.

(2f) In S230, the storage processing module 22 is configured to generate a frame which has a data format of at least Ethernet, or IP, or UDP, while including (i) the information specifying the tool 35 in the header portion and (ii) the discard information in the actual data portion. The generated frame is then transmitted to the tool 35 according to the header portion.

According to such a configuration, a frame whose data format is at least one of Ethernet, IP, and UDP is generated. Thus, a frame including discard information is enabled to be transmitted via the communication line connected to the network switch 20 to the tool 35.

(2g) In the network switch 20, the discard determination table 27A and the port determination table 27B are prepared which describe the setting of whether to store the discard information in the recording storage 25 for each filtering rule (i.e., discard factor) and for each reception port, respectively, in the recording storage 25. In S130, the storage processing module 22 is configured to determine, in response to that a frame is discarded, whether or not the discarded frame is a storage target frame. The storage processing module 22 is configured to store the discard information in the recording storage 25 when the frame to be discarded (i.e., the discarded frame) is determined to be a storage target frame in S140.

According to such a configuration, it is possible to set whether or not the discard information is stored for each filtering rule or for each reception port, so that necessary discard information can be efficiently collected.

The network switch 20 in the above embodiment may correspond to a relay apparatus. The tool 35 may correspond to an external instrument. The discard determination table 27A and the port determination table 27B may correspond to stored information or stored data. The recording storage 25 may correspond to a discard recording storage that stores discard information, a number recording storage that stores the sum of the discarded frames or the like, and a stored information recording storage that stores stored information. In other words, the recording storage 25 may be provided as one or more recording storages 25 that store the respective data.

Of the processing executed by the relay processing module 21, S110, S120, and S150 may correspond to a relay execution module. Moreover, S130 and S140 of the processing executed by the storage processing module 22 may correspond to a discard storage module. S130 may correspond to a storage determination module; S140 may correspond to a number storage module or a storage execution module. Also, S230 may correspond to a discard transmission module. The above relay execution module, the discard storage module, the storage determination module, the number storage module, and the storage execution module may also be provided as a module separate from the relay processing module 21 or the storage processing module.

3. Other Embodiments

While the embodiment of the present disclosure has been described, the present disclosure is not limited to the embodiment described above and can be modified in various manners.

(3a) In the above embodiment, the present embodiment describes the configuration in which the functions as the relay processing module 21, the storage processing module 22, the relay execution module, the discard storage module, the number storage module, and the storage execution module are realized by hardware circuits or circuitry. However, the present disclosure is not limited to this.

For example, these functions or modules may be realized by software processing. In this case, the network switch 20 includes a CPU and a memory; the CPU executes a program in the memory and achieves functions as the relay processing module 21, the storage processing module 22, the relay execution module, the discard storage module, the storage determination module, the number storage module, and the storage execution module.

In other words, the network switch 20 as a relay apparatus may include one or more control circuits (i.e., controllers) to provide a plurality of functions. Such one or more control circuits may include modules (or circuits) to achieve the respective functions such as the relay processing module 21, the storage processing module 22, the relay execution module, the discard storage module, the storage determination module, the number storage module, and the storage execution module.

Note that an individual one of such modules or an individual one of one or more control circuits may be provided by including (i) a hardware circuit or circuitry as described in the embodiment, or (ii) a CPU along with memory storing instructions executed by the CPU, or (iii) both the hardware circuit and the CPU along with memory. Furthermore, an individual one of one or more control circuits may be provided in the network switch 20 or in an external apparatus connected with the network switch 20 via a communication link.

(3b) In the above embodiment, the storage processing module 22 stores all of the reception port, the discard factor, and the time stamp as the discard information in the recording storage 25. However, the present disclosure is not limited to this. For example, the storage processing module 22 may be configured to store at least one of data elements that are a reception port, a discard factor, and a time stamp, as the discard information.

(3c) In the above embodiment, the number of discards with respect to each of the discard factors and the sum of the discarded frames are included in the discard information. However, the present disclosure is not limited to this. For example, the number of discards with respect to each of the discard factors and the sum of the discarded frames may be recorded separately from the discard information.

(3d) In the above embodiment, it has been described that the external command from the tool 35 is input from the port. However, the present disclosure is not limited to this. For example, the command may be input from a physical cable other than the port.

(3e) Multiple functions served by a single element in the embodiments described above may be served by multiple elements. A single function served by a single element may be served by multiple elements. Further, a plurality of functions of a plurality of elements may be implemented by one element, or one function implemented by a plurality of elements may be implemented by one element. A part of the configuration of the above embodiment may be omitted. At least a portion of the configuration of one of the embodiments described above may be added to that of another one of the embodiments described above or replace that of the other one of the embodiments described above.

(3f) In addition to the communication system 1 described above, the present disclosure can also be realized in various forms such as an apparatus or device such as a network switch 20 as a component of the communication system 1, a program for causing a computer to function as the apparatus or device, a non-transitory tangible storage medium in which the program is recorded such as a semiconductor memory, and a communication method.

For reference to further explain features of the present disclosure, a related art is described as follows.

There is a relay apparatus provided with a function of filtering frames that are to be relayed. A frame is general data including a header and actual data corresponding to a predetermined protocol. For example, there is a technique which prepares a large number of filtering rules and sets whether to relay or discard a frame according to the large number of filtering rules.

Detailed studies by the inventors have found that the above relay apparatus may be unable to analyze later whether or not the frame has been discarded. Therefore, if a security attack such as unauthorized access is received, it is difficult to analyze it later.

It is therefore desired to allow a relay apparatus that relays a frame between a plurality of communication lines to analyze later a security attack when the security attack is received.

Aspects of the disclosure described herein are set forth in the following clauses.

According to a first aspect of the present disclosure, a relay apparatus that relays a frame between a plurality of communication lines is provided to include a relay execution module and a discard storage module. The relay execution module is configured to execute either (i) transmitting a received frame, which is received from a communication line, to a different communication line or (ii) discarding the received frame as a discarded frame, according to a preset filtering rule. The discard storage module is connected with a discard recording storage; the discard storage module is configured to store discard information indicating information on the discarded frame in the discard recording storage in response to that the relay execution module discards the received frame as the discarded frame.

According to a second aspect of the present disclosure, a relay apparatus that relays a frame between a plurality of communication lines, the relay apparatus includes one or more control circuits connected with a discard recording storage. The one or more control circuits is configured to execute either (i) transmitting a received frame, which is received from a communication line, to a different communication line or (ii) discarding the received frame as a discarded frame, according to a preset filtering rule, and store discard information indicating information on the discarded frame in the discard recording storage in response to that the received frame is discarded as the discarded frame.

According to such a configuration according to the first or second aspect, when the frame is discarded according to the filtering rule, the discard information can be recorded. Therefore, when a security attack such as an unauthorized access is received, the discard information is referred to later to analyze the contents of the security attack.

What is claimed is:

1. A relay apparatus that relays a frame between a plurality of communication lines, the relay apparatus comprising:
   a relay execution module configured to execute either (i) transmitting a received frame, which is received from a communication line, to a different communication line or (ii) discarding the received frame as a discarded frame, according to a preset filtering rule;
   a discard storage module connected with a discard recording storage, the discard storage module being configured to store discard information indicating information on the discarded frame in the discard recording storage in response to that the relay execution module discards the received frame as the discarded frame; and
   a discard transmission module connected with the discard recording storage, the discard transmission module being configured to transmit, upon receiving a preset external command, the discard information stored in the discard recording storage to a preset external instrument.

2. The relay apparatus according to claim 1, wherein the discard storage module is further configured to store, as the discard information, at least one of data elements that include (i) a reception port indicating a port that receives a frame, (ii) a discard factor, and (iii) a time stamp indicating information regarding a time when the received frame is discarded or a time when the discard information is generated.

3. The relay apparatus according to claim 1, further comprising:
   a number storage module connected with a number recording storage, the number storage module being configured to store (i) a number of discards with respect to each of discard factors and (ii) a sum of discarded frames, in addition to the discard information in the discard recording storage.

4. The relay apparatus according to claim 1, wherein the discard storage module is further configured to store, as the discard information, header information including at least one of headers that include an Ethernet (registered trademark) header, a VLANTag, an IP header, a TCP header, and a UDP header.

5. The relay apparatus according to claim 1, further comprising:
   a storage determination module connected with a stored information recording storage that stores stored information indicating whether the discarded frame is a storage target frame whose discard information is to be stored in the discard recording storage by describing settings of whether or not to store the discard information of the discarded frame in the discard recording storage with respect to each filtering rule or each reception port, the storage determination module being configured to determine whether the received frame is the storage target frame in response to that the relay execution module discards the received frame; and
   a storage execution module connected with the discard recording storage, the storage execution module being configured to store the discard information in the discard recording storage in response to that the discarded frame is determined to be the storage target frame.

6. The relay apparatus according to claim 1, wherein:
   the discard transmission module is further configured to generate a generated frame whose data format is at least Ethernet, or IP, or UDP, the generated frame including information specifying the external instrument in a header portion and the discard information in an actual data portion; and
   the discard transmission module is further configured to transmit the generated frame to the external instrument according to the header portion.

7. A relay apparatus that relays a frame between a plurality of communication lines, the relay apparatus comprising:
   a relay execution module configured to execute either (i) transmitting a received frame, which is received from a communication line, to a different communication line or (ii) discarding the received frame as a discarded frame, according to a preset filtering rule;
   a discard storage module connected with a discard recording storage, the discard storage module being configured to store discard information indicating information on the discarded frame in the discard recording storage in response to that the relay execution module discards the received frame as the discarded frame;
   a storage determination module connected with a stored information recording storage that stores stored information indicating whether the discarded frame is a storage target frame whose discard information is to be stored in the discard recording storage by describing settings of whether or not to store the discard information of the discarded frame in the discard recording storage with respect to each filtering rule or each reception port, the storage determination module being configured to determine whether the received frame is the storage target frame in response to that the relay execution module discards the received frame; and
   a storage execution module connected with the discard recording storage, the storage execution module being configured to store the discard information in the discard recording storage in response to that the discarded frame is determined to be the storage target frame.

8. The relay apparatus according to claim 7, wherein the discard storage module is further configured to store, as the discard information, header information including at least one of headers that include an Ethernet (registered trademark) header, a VLANTag, an IP header, a TCP header, and a UDP header.

9. The relay apparatus according to claim 7, further comprising:
   a number storage module connected with a number recording storage, the number storage module being configured to store (i) a number of discards with respect to each of discard factors and (ii) a sum of discarded frames, in addition to the discard information in the discard recording storage.

10. The relay apparatus according to claim 7, wherein the discard storage module is further configured to store, as the discard information, at least one of data elements that include (i) a reception port indicating a port that receives a frame, (ii) a discard factor, and (iii) a time stamp indicating information regarding a time when the received frame is discarded or a time when the discard information is generated.

\* \* \* \* \*